Sept. 19, 1961 H. A. CLARKE 3,001,082
REGULATED POWER SUPPLY SYSTEMS
Filed Dec. 4, 1957 2 Sheets-Sheet 1

REFERENCE VOLTAGE

INVENTOR.
Herbert A. Clarke
BY J. D. O'Brien
C. Baxter Warnes
ATTORNEYS

United States Patent Office 3,001,082
Patented Sept. 19, 1961

3,001,082
REGULATED POWER SUPPLY SYSTEMS
Herbert A. Clarke, Moorestown, N.J., assignor, by mesne assignments, to the United States of America as represented by the Secretary of the Navy
Filed Dec. 4, 1957, Ser. No. 700,728
5 Claims. (Cl. 307—19)

This invention relates to improved regulated electrical supply systems and more particularly to improved systems for controlling a plurality of regulated supply circuits.

It is desirable in many applications to combine the output circuits of a number of electrical power supply units of the same or different load capacities to supply one load. In other situations a number of loads may receive power from several units of the same or different load capacities. It is necessary, in some cases, to hold the voltage or current applied to the load or loads constant regardless of variations in line voltage or load impedance. Under all circumstances, it is desirable to reduce the number, size and weight of the circuit components.

Therefore, it is an object of this invention to provide an improved voltage regulating system controlling a plurality of regulating devices in a plurality of power supply circuits.

Another object of this invention is to provide an improved current regulating system controlling a plurality of regulating devices in a plurality of power supply circuits.

It is a further object of this invention to provide an improved electrical regulating system controlling a plurality of regulating devices in a plurality of power supply units of any capacity connected to any load requirements.

The foregoing objects are achieved by utilizing regulating devices such, for example, as vacuum tubes which regulate current flow in terms of grid potential. The voltage output of at least one electrical supply unit in a plurality of units can be sensed, amplified and made to drive the regulators in all units. This avoids the more expensive, space and weight consuming practice of duplicating the sensing and amplification circuitry in each power supply unit. Moreover, the control is simultaneous and equal for all units operating from the same line connection.

The invention finds special importance when an electrical system is composed of interchangeable "plug-in" packages or modules containing complete circuit functions. For example, a number of basic units may be stacked in parallel to provide load current capacity in multiples of that of the standard unit. This invention would require only one control unit regardless of the number of supply units.

One embodiment of this invention includes at least two electric supply units, each unit supplying power to the same or different loads, and each preferably including a rectifier, filter and at least one grid-controlled series regulator tube or other variable impedance device. The invention utilizes a single sensing and control circuit, which preferably includes a difference amplifier to sense changes in the output of at least one supply unit and compare it with a standard voltage. Any change in the output of all the units is corrected by the simultaneous control of all of the regulators. In a preferred arrangement, the signal from the difference amplifier is amplified and fed to a cathode follower which simultaneously drives the grids of the regulator tubes regulating the output of the circuit.

The invention will be described in greater detail by reference to the accompanying drawings in which.

Similar reference characters are applied to similar elements throughout the drawings.

Figure 1:
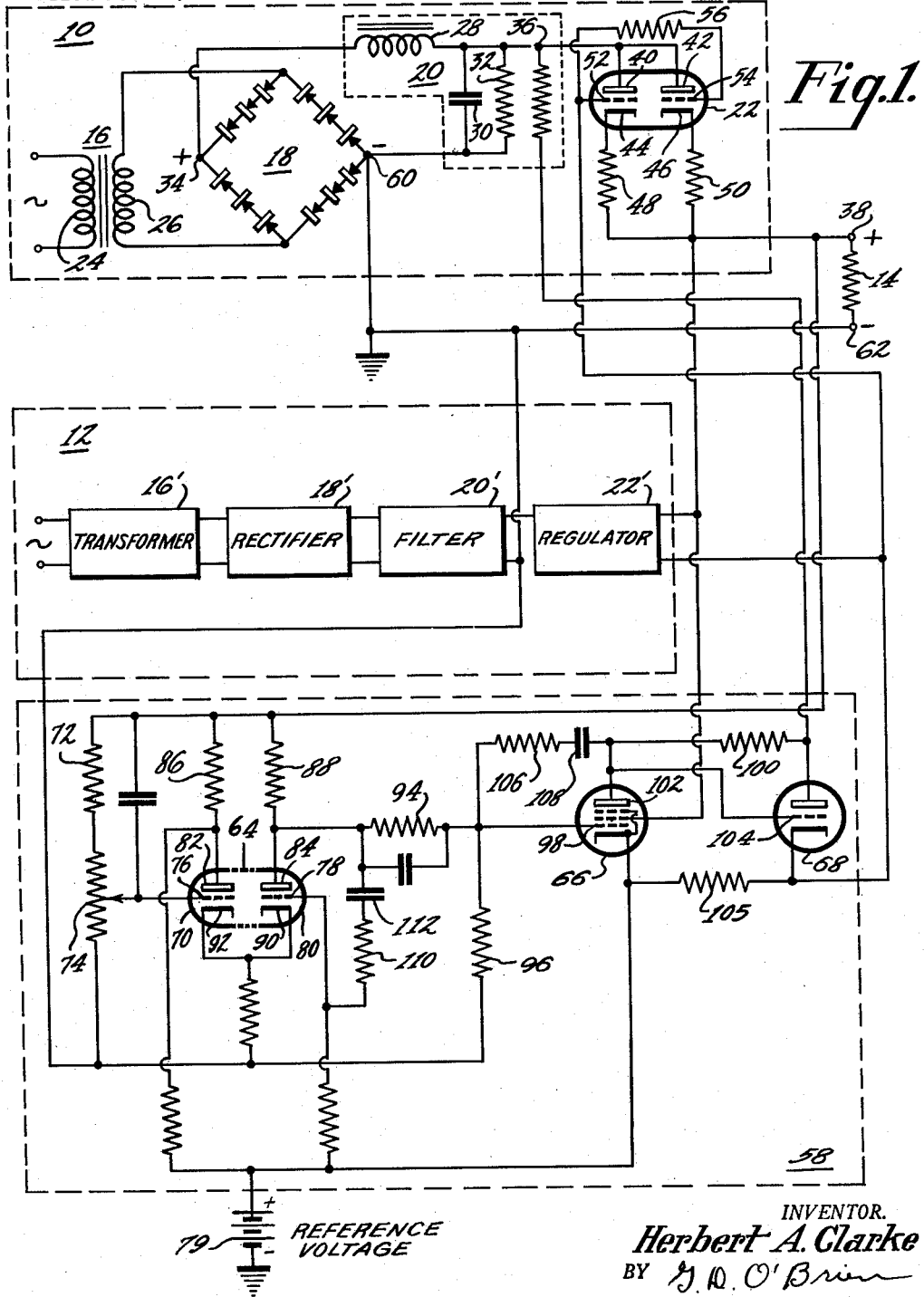
FIGURE 1 is a schematic block circuit diagram of one embodiment of the invention including a plurality of electrical supply circuits of the same voltage output, in combination with a common control device.

Referring to FIG. 1, a plurality of power supply units 10 and 12, of similar voltage output and circuit configuration, are connected in parallel to a load 14. Each of the power supplies 10 and 12 includes a transformer 16, rectifier 18, filter 20 and regulator 22. The primary 24 of the transformer 16 of the power supply 10 is connected to a source of alternating current. The secondary 26 of the transformer 16 is connected to a full wave bridge rectifier 18, which is composed, for example, of twelve diodes. The use of a bridge rectifier is desirable to avoid a high peak inverse voltage on the diodes. A filter circuit 20 comprising, for example, a series choke 28, shunt capacitor 30 and shunt bleeder resistor 32 is connected to the positive output terminal 34 of the bridge rectifier 18. A series regulator circuit comprising, for example, a twin triode vacuum tube 22 is connected between the positive output terminal 36 of the filter and the positive terminal 38 of the load 14. The anodes 40, 42 of the regulator tube 22 are connected to the positive terminal 36 of the filter. The cathodes 44, 46 of said regulator tube 22 are coupled through overload-limiting cathode resistors 48 and 50 to the positive terminal 38 of the load 14. The grids 52, 54 of said regulator tube are decoupled by an isolating resistor 56. Voltage regulation is achieved by controlling the bias voltage on the grids 52 and 54 respectively, as well as the grids of the corresponding tube in unit 12 by control signals derived from the output of a sensing and control amplifier 58. The negative output terminal 60 of the rectifier 18 output is connected to the second terminal 62 of the load.

The control amplifier 58 comprises, for example, a difference amplifier 64, a pentode voltage amplifier 66, and a cathode follower output amplifier 68. The input circuit of the control amplifier 58 is connected across the load 14 which is energized by the combined outputs of the power supply units 10 and 12. The input signal to a first stage 70 of the difference amplifier 64 is derived from a voltage divider composed of a fixed resistor 72 and a variable resistor 74 and applied to the first grid 76 of a twin triode difference amplifier 64. Initially the tap on the variable resistor 74 is adjusted so that the cathode-to-grid potentials of each stage of the twin triode tube 64 are equal. This cathode-to-grid voltage is that of the reference voltage which is applied to the grid 78 of the second stage 80 of the difference amplifier 64. The reference voltage may be derived, for example, from a battery 79. Plate potential to the anodes 82 and 84 of the difference amplifier stages is supplied from the positive load terminal 38 through anode resistors 86 and 88. The first stage 70 of the difference amplifier 64 acts as a cathode follower, therefore any signal applied to the grid 76 of the first stage 70 is applied to the cathode 90 of the second stage 80 since the cathodes 90 and 92 of the two stages are connected together. The output of the second stage 80 is proportional to its cathode-to-grid potential and hence approximately proportional to the difference between the voltages applied to the grids 76 and 78. An increase in the output voltage of the combined power supplies 10 and 12 will then increase the output voltage of the difference amplifier 64 and provide a voltage decrease across the anode resistor 88 of the second stage 80. The resultant voltage increase at the anode 84 is applied through a voltage divider comprising, for example, resistors 94 and 96 to the control grid 98 of a pentode voltage amplifier tube 66. A pentode is used for the voltage amplifier stage in order to provide a high voltage gain in a single stage. The output of the difference amplifier 64 is amplified and inverted by the pentode amplifier 66 and appears as an increased potential across the load resistor 100 of the pentode amplifier 66. By a connection from the anode 102 of the pentode amplifier 66 to the grid 104 of the cathode follower 68, the resultant decrease in the potential of anode 102 is applied to the cathode follower 68. The use of a cathode follower is desirable so that the control amplifier may efficiently drive a multiplicity of regulator stages 22 with the attendant high capacitance load imposed upon this driving stage. A decrease in voltage thereby occurs across cathode resistor 105 of the cathode follower 68. This decreased potential is applied to the grids 52 and 54 of the regulator tube 22. This reduces the conductance of the regulator tube 22 so as to lower the voltage across the load 14 and approach the initial condition. Similarly a decrease in the combined output voltage of the power supplies would result in an increased voltage on the grids 52 and 54 of the regulator tube 22, thereby increasing the conductance of the tube 22 so as to raise the voltage across the load 14 and approach the initial condition. To eliminate oscillation in pentode amplifier 66 a series combination of a resistor 106 and a capacitor 108 provide the proper phase shift between the control grid 98 and the anode 102. To eliminate oscillation in the second stage 80 of the difference amplifier 64 a series combination of a resistor 110 and a capacitor 112 provide the proper phase shift between the plate 84 and the grid 78 of the second stage 80 of the difference amplifier 64.

Figure 2:
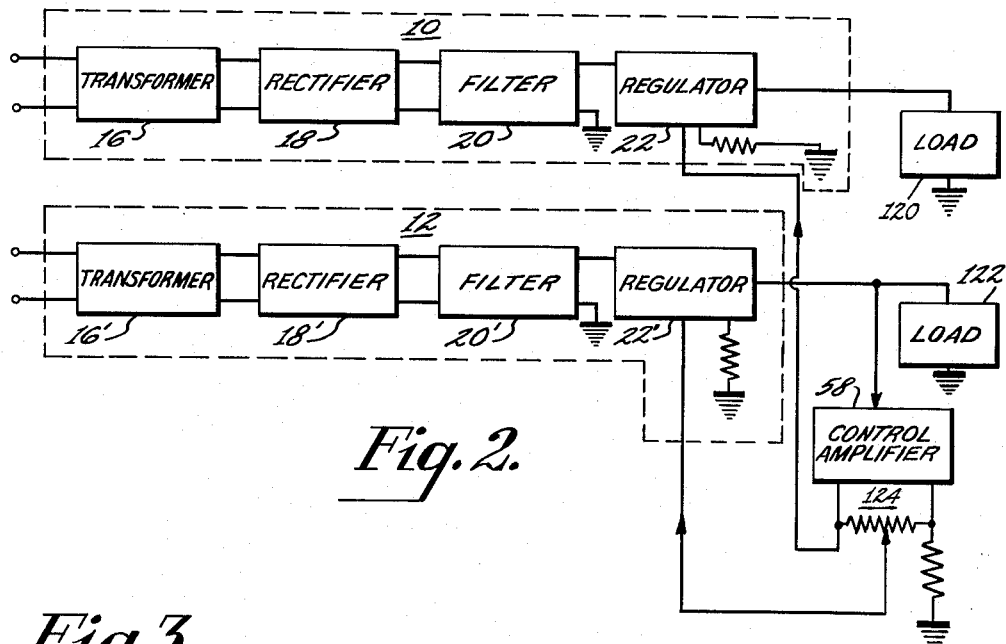
FIGURE 2 is a schematic block circuit diagram of a second embodiment of the invention including power units of different voltage output having a common control amplifier.

In the second embodiment of the invention shown in FIG. 2, power supply units 10 and 12 of different output voltages are connected to separate loads 120 and 122. The control amplifier 58 is connected to sample the voltage across one load 122. The output of the control amplifier is applied to a voltage divider 124. The grids of the regulator tubes 22, 22' of power supplies 10 and 12 are then driven with voltages properly proportioned to the output voltages of the individual supply. In all other respects the operation of this embodiment of the invention is the same as described with respect to FIG. 1. This circuit will properly regulate voltage where similar loads 120 and 122 are affected by some similar cause so as to change proportionally.

Figure 3:
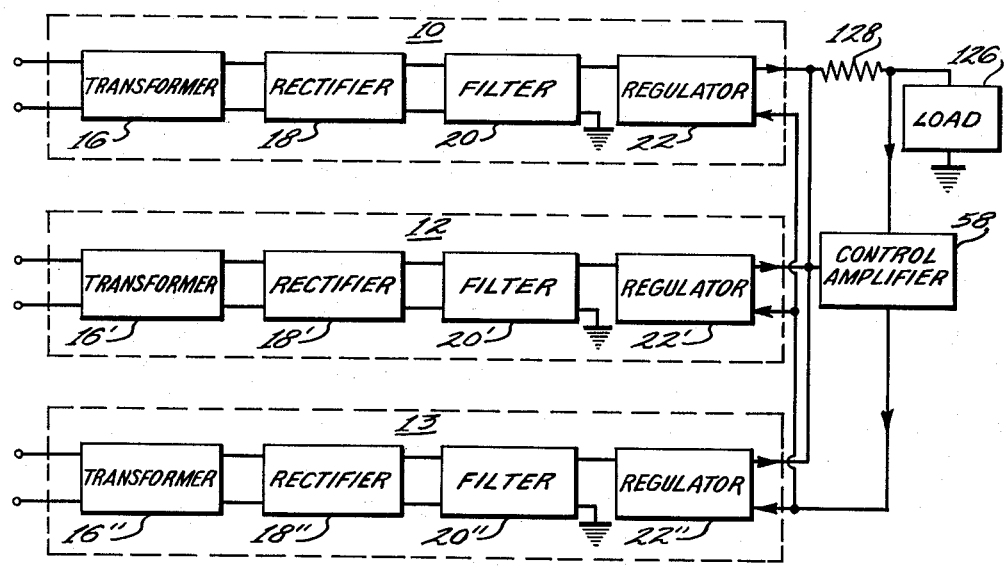
FIGURE 3 is a schematic block circuit diagram of a third embodiment of the invention including power units of the same current capacity having a common control amplifier arranged to respond to changes in current output.

In a third embodiment of the invention, shown in FIG. 3, power supply units 10, 12, 13 of the same output voltage are connected in parallel to load 126. In series between the load 126 and the power supplies is a temperature stable precision shunt 128. The control amplifier input is connected in parallel with the precision shunt. The voltage across the shunt 128 rather than the voltage across the load is then compared to the reference voltage and used as a measure of load current. The device then operates as described previously to maintain a constant voltage across the shunt 128 which then assures a condition of constant current through the load.

Obviously many modifications and variations of the present invention are possible in the light of the above teachings. It is therefore, to be understood that within the scope of the appended claims, the invention may be practiced otherwise than is specifically described.

I claim:

1. Voltage regulating apparatus comprising in combination a plurality of unidirectional voltage supply circuits, each said circuit including an electronic variable impedance regulating device, separate load means connected to each of said circuits, an electronic sensing device responsive to changes in potential across one of said load means to provide a plurality of control effects and means for separately applying said control effects to control said regulating devices.

2. Voltage regulating apparatus comprising in combination a plurality of unidirectional voltage supply circuits, each said circuit including a variable impedance regulating device, load means connected to said circuits, a sensing device responsive to changes in the output potential of at least one of said circuits to provide a single control effect, said sensing device comprising connections for a source of reference potential, a difference amplifier connected to said reference potential connections and to said output potential to provide a difference potential, a unidirectional current amplifier for amplifying said difference potential, means for applying said control effect to simultaneously control all of said regulating devices, said last means comprising a cathode follower and means for connecting said cathode follower to said regulator devices to vary the impedance of said regulator devices in each said circuit according to changes in voltage across the load.

3. Current regulating apparatus comprising a plurality of paralleled unidirectional current supply circuits of the same voltage output, each said circuit including an electronic current regulating device, common load means connected to said circuits, an electronic sensing device responsive to changes in the current output of said circuits to provide a single control effect and means for applying said control effect to simultaneously control all of said regulating devices.

4. Current regulating apparatus comprising a plurality of unidirectional current supply circuits, each said circuit including an electronic current regulating device, load means connected to each of said circuits, an electronic sensing device responsive to changes in the current output of at least one of said circuits to provide a single control effect and means for applying said control effect to simultaneously regulate all of said regulating devices.

5. Current regulating apparatus comprising a plurality of circuits in parallel, each said circuit including connections for a source of alternating current, a rectifier connected to said source connections, a filter, and paralleled grid-controlled current regulator tubes in series with each of said circuits, load means connected to said circuits, and single control means for said regulator tubes, said control means comprising connections for a source of reference potential, load current detecting means, a difference amplifier connected to said reference potential connections and to said detecting means to provide a difference potential, a unidirectional current amplifier and a cathode follower for amplifying said difference potential, and means connecting said cathode follower to the grids of said regulator tubes to vary the impedance of said regulator tubes in each said circuit according to changes in the current through said load means.

References Cited in the file of this patent

UNITED STATES PATENTS

| | | |
|---|---|---|
| 2,337,911 | Mayer et al. | Dec. 28, 1943 |
| 2,504,155 | Roman | Apr. 18, 1950 |
| 2,512,989 | Aicher | June 27, 1950 |
| 2,594,006 | Friend | Apr. 22, 1952 |
| 2,790,133 | Day | Apr. 23, 1957 |
| 2,806,963 | Woll | Sept. 17, 1957 |